United States Patent [19]
Majid et al.

[11] Patent Number: 5,852,550
[45] Date of Patent: Dec. 22, 1998

[54] SWITCHED-MODE POWER SUPPLY CIRCUIT HAVING A VERY LOW POWER STAND-BY MODE

[75] Inventors: Naveed Majid, Moheoan Lake, N.Y.; Tom Mobers, Gravee; Erwin G. R. Seinen, Malden, both of Netherlands

[73] Assignee: Philips Electronics North America Corporation, New York, N.Y.

[21] Appl. No.: 905,660

[22] Filed: Aug. 4, 1997

[51] Int. Cl.⁶ .................................................. H02M 3/335
[52] U.S. Cl. ............................................. 363/21; 363/19
[58] Field of Search .................. 363/19, 21, 41; 323/282

[56] References Cited

U.S. PATENT DOCUMENTS

| | | | |
|---|---|---|---|
| 4,766,528 | 8/1988 | Marinus | 363/21 |
| 4,788,591 | 11/1988 | Decraemer | 358/190 |
| 5,126,930 | 6/1992 | Ahn | 363/21 |
| 5,453,921 | 9/1995 | Shutts | 363/21 |
| 5,703,764 | 12/1997 | Hermann et al. | 363/21 |

*Primary Examiner*—Stuart N. Hecker
*Attorney, Agent, or Firm*—Edward W. Goodman

[57] ABSTRACT

A switched-mode power supply circuit includes a first controller for controlling power to a main power output through a first transformer, and a second controller for controlling power to a control output through a second transformer. In order to effect a very low power stand-by mode, the second controller turns off the first controller, the second controller only operating. When a load is selectively coupled across the control output, the second controller detects this load and turns on the first controller thereby effecting the operating mode.

8 Claims, 4 Drawing Sheets

SWITCHED-MODE POWER SUPPLY CIRCUIT HAVING A VERY LOW POWER STAND-BY MODE

BACKGROUND OF THE INVENTION

1. Field of the Invention

The subject invention relates to switched-mode power supply circuits for television receivers, in which, during a stand-by mode, the switched-mode power supply circuit exhibits a burst-mode operation.

2. Description of the Related Art

FIG. 1 shows the essential portions of a known switched-mode power supply circuit which is described in co-pending patent application Ser. No. 08/903,779 (Attorney Docket No. PHA 23,264), assigned to the Assignee of the subject application. In particular, a diode rectifier bridge REC is connected to a line voltage source. An output from the rectifier bridge REC is connected to ground through a capacitor C11 and to one end of a primary winding L11 of a transformer TR1. The other end of primary winding L11 is connected to one terminal of a controllable switch Tr11, the other terminal of which being connected to ground through a sense resistor $R_{SENSE}$. A first secondary winding L12 of the transformer TR1 has a first end and a second end connected to each other through a series arrangement of a diode D11 and a main output capacitor C12, the second end of the first secondary winding L12 also being connected to ground. A load (not shown) may be connected across the main output capacitor C12.

The transformer TR1 also includes a second secondary winding L13 having a first end and a second end connected to each other through a series arrangement of a diode D12 and a control output capacitor C13, the second end of the second secondary winding L13 also being connected to ground. A microprocessor (not shown), for controlling, for example, a television receiver in which the switched-mode power supply circuit is installed, is connected across the control output capacitor C13 to receive operating power.

The first end of the first secondary winding L12 is also connected via a diode D13 and a controllable switch Sw1 to one end of the control output capacitor C13, while the control output capacitor C13 is shunted by a series arrangement of a light emitting diode D14 of an opto-coupler, a Zener diode Z1 and a controllable switch Sw2. The controllable switches Sw1 and Sw2 are controlled by a signal from the microprocessor to initiate the stand-by mode of the switched-mode power supply circuit.

The transformer TR1 further includes an auxiliary primary winding L14 which has one end connected, via a resistor R11, to a DEMAG input of a controller IC1, and also, via a diode D15, to ground through a $V_{AUX}$ capacitor C14, to a $V_{AUX}$ input of the controller IC1, and to one terminal of a light sensor Tr12 of the opto-coupler, the other terminal of the light sensor Tr12 being connected to a stand-by mode detecting input (OOB) of the controller IC1. The other end of the auxiliary primary winding L14 is connected to ground. In addition, a series arrangement of two resistors, R12 and R13, and a Zener diode Z2 connect the output of the rectifier bridge REC to ground. The junction between resistor R13 and Zener diode Z2 is connected to the OOB input via a power switch Sw3, the OOB input being further connected to ground by a resistor R14. The controller IC1 also has a $V_{IN}$ input connected to the output of the rectifier bridge REC, a driver output connected to the control input of controllable switch Tr11, and an $I_{SENSE}$ input connected to the resistor $R_{SENSE}$.

In operation, when switch Sw3 is closed by the user, the switched-mode power supply circuit is in full operation. When burst mode stand-by operation is desired, the microprocessor closes switches Sw1 and Sw2. The closing of switch Sw1 decouples the main output capacitor C12 and the main load from the first secondary winding L12 and couples this winding to the second secondary winding L13. The switch Sw2 connects the light emitter D14 of the opto-coupler and when the voltage across the control output capacitor exceeds that of the Zener diode Z1 due to the coupling of L12 to L13, the light emitter D14 emits light thereby exciting the light sensor Tr12. The light sensor Tr12 then applies the Vaux voltage (across capacitor C14) to the OOB input of the controller IC1 which thereupon stops applying switching signals to the controllable switch Tr11. The Vaux voltage then begins to drop, and when it drops below a certain level, the controller IC1 begins to apply current to capacitor C14. At the same time, the voltage across capacitor C13 has dropped and when it drops below the Zener voltage, the light emitter D14 shuts off and the light sensor Tr12 stop applying voltage to the OOB input. Once the Vaux voltage increases above a particular level, the controller IC1 ceases applying current to capacitor C14 and re-commences applying switching signals to the controllable switch Tr11. This cycle then repeats itself until switches Sw1 and Sw2 are opened by the microprocessor.

While the above burst mode stand-by operation uses less power than when the switched-mode power supply circuit is in the on state, Applicants have found that the amount of power consumed is still too large.

SUMMARY OF THE INVENTION

An object of the present invention is to provide a switched-mode power supply circuit which has a low power stand-by mode.

This object is achieved in a switched-mode power supply circuit having an operating mode and a low power stand-by mode, said switched-mode power supply circuit comprising means for generating a d.c. supply voltage having a first output terminal and a second output terminal; a first transformer having a primary winding, an auxiliary primary winding and a secondary winding, said primary winding having a first terminal coupled to the first output terminal of said generating means, and a second terminal; a second transformer having a primary winding, an auxiliary primary winding and a secondary winding, a voltage across said auxiliary primary winding tracking a voltage across said secondary winding, said primary winding having a first terminal coupled to the first output terminal of said generating means, and a second terminal; a controllable switch connected in series with the second terminal of said primary winding and the second output terminal of said generating means; a main output capacitor coupled across output terminals of said secondary winding of said first transformer for providing a first main output voltage in the operating state and a second main output voltage in the stand-by mode, said second main output voltage being lower than said first main output voltage; a control output capacitor coupled across output terminals of said secondary winding of said second transformer for providing a control output voltage; means for selectively coupling an additional load across said control output capacitor; a first controller having an output for supplying switching signals to said controllable switch, an auxiliary voltage sensing input coupled, via a shunting auxiliary capacitor, to said auxiliary primary winding of said first transformer, and a control input, said first controller comprising means for turning off said start-up current source and for stopping said switching signals when a voltage on said control input drops below a predetermined level, and means for coupling said control input to the first output terminal of said generating means to receive a voltage greater than said predetermined level; and a second controller having a first terminal coupled to the second terminal of the primary winding of the second transformer, a second terminal coupled to the second output terminal of said generating means, a third terminal coupled to said auxiliary primary winding of said second transformer for detecting a voltage thereon, and a fourth terminal coupled to the control input of said first controller, wherein to effect said low power stand-by mode, said selective coupling means uncouples said additional load from across said control output capacitor, and said second controller, through said fourth terminal prevents a voltage on said control input of said first controller from exceeding said predetermined level, and said operating mode is effected by said selective coupling means coupling said additional load across said control output capacitor, and said second controller allowing a voltage on said control input of said first controller to exceed said predetermined level.

In the switched-mode power supply circuit of the subject invention, the first controller controls the main output power of the switched-mode power supply circuit through the first transformer, while the second controller controls the power to a control microprocessor through the second transformer. During low power stand-by operation, the second controller turns off the first controller, and the second controller only supplies power to the microprocessor through the secondary winding of the second transformer. When full power is desired, the microprocessor closes a switch connecting an additional load across the secondary winding of the second transformer. While this additional load is not directly detected, the drop in voltage across the secondary winding is reflected in a drop in voltage across the auxiliary primary winding of the second transformer. In attempting to compensate for the additional power drain in the secondary winding by additionally switching the connection of the primary winding to the d.c. source, the second controller senses the closing of the switch by the microprocessor and, in turn, turns on the first controller for supplying main power to the secondary winding of the first transformer.

A further object of the present invention is to provide a very low power stand-by mode in a switched-mode power supply which alternatively has a burst mode stand-by operation.

This object is achieved in a switched-mode power supply circuit having an operating mode, a burst stand-by mode and a low power stand-by mode, said switched-mode power supply circuit comprising means for generating a d.c. supply voltage having a first output terminal and a second output terminal; a first transformer having a primary winding, an auxiliary primary winding and a secondary winding, said primary winding having a first terminal coupled to the first output terminal of said generating means, and a second terminal; a second transformer having a primary winding, an auxiliary primary winding and a secondary winding, a voltage across said auxiliary primary winding tracking a voltage across said secondary winding, said primary winding having a first terminal coupled to the first output terminal of said generating means, and a second terminal; a controllable switch connected in series with the second terminal of said primary winding of said first transformer and the second output terminal of said generating means; a main output capacitor coupled across output terminals of said secondary winding of said first transformer for providing a first main output voltage in the operating state and a second main output voltage in the stand-by mode, said second main output voltage being lower than said first main output voltage; a control output capacitor coupled across output terminals of said secondary winding of said second transformer for providing a control output voltage; means for selectively coupling a load across the output terminals of said secondary winding of said second transformer; means for selectively coupling one of the output terminals of said secondary winding of said first transformer to said secondary winding of said second transformer during said burst stand-by mode; an opto-coupler having light emitting means and light detecting means optically coupled to said light emitting means; means for selectively coupling the light emitting means of said opto-coupler across said control output capacitor during said burst stand-by mode; means for causing said light emitting means to emit light to said light detecting means when the control output voltage across said control output capacitor exceed a predetermined value during said burst stand-by mode; a first controller having an output for supplying switching signals to said controllable switch, an auxiliary voltage sensing input coupled, via a shunting auxiliary capacitor, to said auxiliary primary winding of said first transformer, and a stand-by mode detecting input coupled to an output of said light detecting means, said light detecting means having an input coupled to receive said auxiliary voltage, said controller comprising a start-up current source for charging said auxiliary capacitor during start-up of said switched-mode power supply, whereby, during said burst stand-by mode, said start-up current source is used to intermittently charge the auxiliary capacitor when said controllable switch is not switching, said first controller further comprising means for turning off said start-up current source and for stopping said switching signals when a voltage on said stand-by mode detecting input drops below a predetermined level; and a second controller having a first terminal coupled to the second terminal of the primary winding of the second transformer, a second terminal coupled to the second output terminal of said generating means, a third terminal coupled to said auxiliary primary winding of said second transformer for detecting a voltage thereon, and a fourth terminal coupled to the stand-by mode detecting input of said first controller, wherein to effect said low power stand-by mode, said selective coupling means uncouples said load from said secondary winding of said second transformer, and said second controller, through said fourth terminal prevents a voltage on said stand-by mode detecting input of said first controller from exceeding said predetermined level, and said operating mode is effected by said selective coupling means coupling said load to said secondary winding of said second transformer, and said second controller allowing a voltage on said stand-by mode detecting input of said first controller to exceed said predetermined level.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
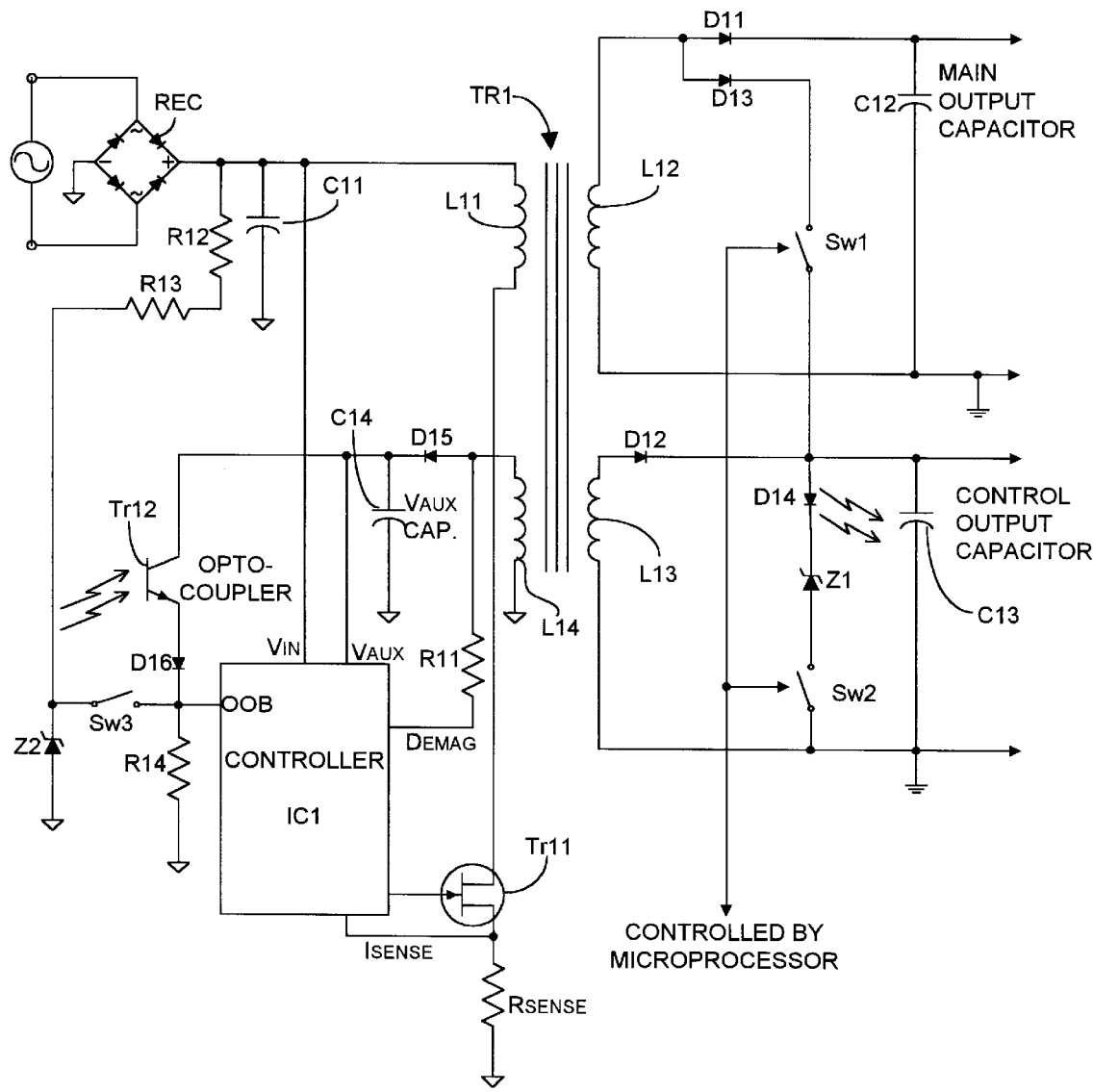
FIG. 1 shows a schematic block diagram of a known switched-mode power supply circuit.
Figure 2:
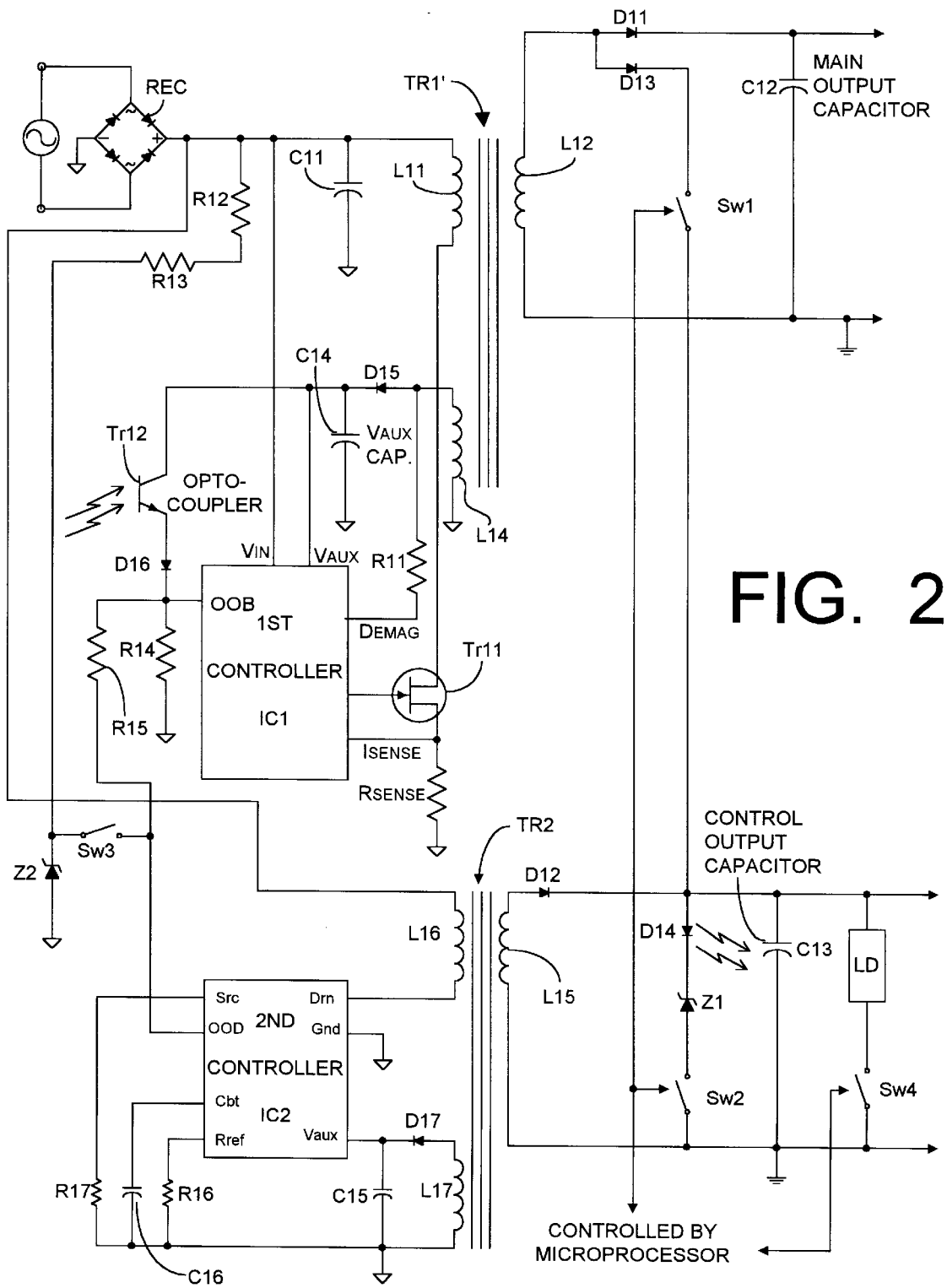
FIG. 2 shows a schematic block diagram of a switched-mode power supply circuit incorporating the subject invention.

FIG. 2 shows a schematic block diagram of the switched-mode power supply circuit of the subject invention. This switched-mode power supply circuit is substantially similar to that shown in FIG. 1 with the exception that transformer TR1' only has a single secondary winding L12 while a second transformer TR2 has a secondary winding L15 for supplying the microprocessor and the control output capacitor C13. A load LD is switchably connected across the control output capacitor C13 by a switch Sw4 controlled by the microprocessor. The primary winding L16 of the second transformer TR2 is connected to the output terminal of the diode rectifier REC and to a Drn input of a second controller IC2. The switch Sw3 is now connected directly to an input OOD of the second controller IC2, and through a resistor R15 to the input OOB of the first controller IC1.

One end of an auxiliary primary winding L17 of the second transformer TR2 is connected through a diode to a Vaux input of the second controller IC2, while the other end of the auxiliary primary winding L17 is connected to ground. The Vaux input is also connected to ground through a capacitor C15. The second controller IC2 also includes a Gnd input which is connected to ground. An Rref input and an Src input are connected to ground via respective resistors R16 and R17, while a Cbt input is connected to ground via a capacitor C16.

Figure 3:
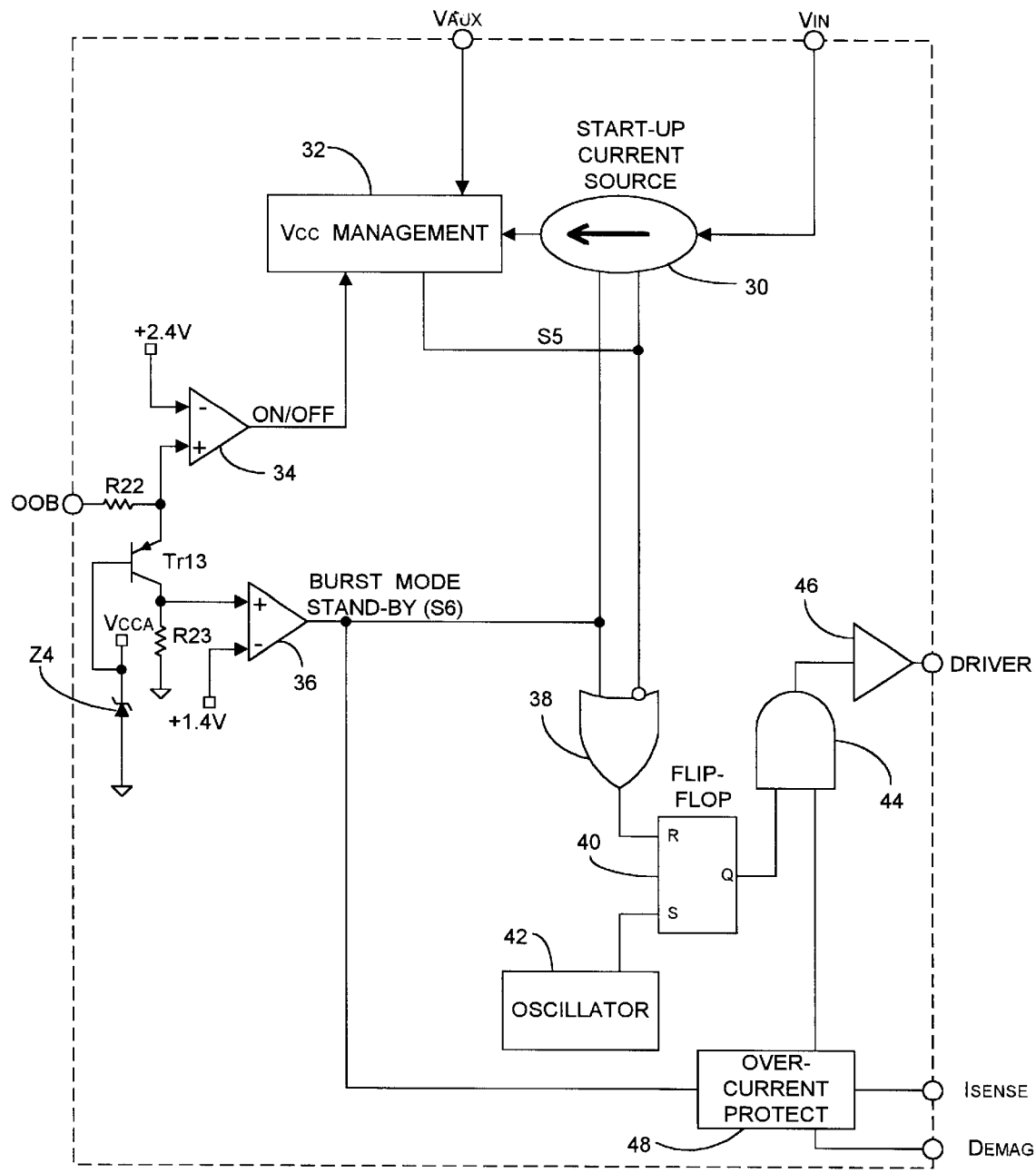
FIG. 3 shows a schematic block diagram of a first controller for the switched-mode power supply circuit.

FIG. 3 shows a schematic block diagram of the first controller IC1. The controller IC1 includes a start-up current source 30 coupled to the $V_{IN}$ input and a Vcc management circuit 32 connected to the $V_{AUX}$ input. The OOB input is connected to a resistor R22 and then to a first comparator 34 for comparing the voltage thereon to +2.4 V, and generating an "OFF/ON" signal. This OFF/ON signal is applied to an input of the Vcc management circuit 32. The resistor R22 is also connected to the emitter of an PNP transistor Tr14. The base of transistor Tr14 is connected to a Vcca voltage source, and to ground via a Zener diode Z4. The collector of the transistor Tr14 is connected to a second comparator 36 for comparing the voltage thereon to +1.4 V, for generating a "Burst Mode Stand-by" signal S6. This signal S6 is applied to the start-up current source 30 and to one input of an OR-gate 38. An output (S5) from the Vcc management circuit 32 is also applied to the start-up current source 30 and to an inverting input of OR-gate 38. An output from OR-gate 38 is applied to the reset input of an RS flip-flop 40, the set input being connected to an output of an oscillator 42. The Q output from the RS flip-flop 40 is connected to one input of an AND-gate 44 which has an output connected to a driver 46 for driving the controllable switch Tr11.

Figure 4:
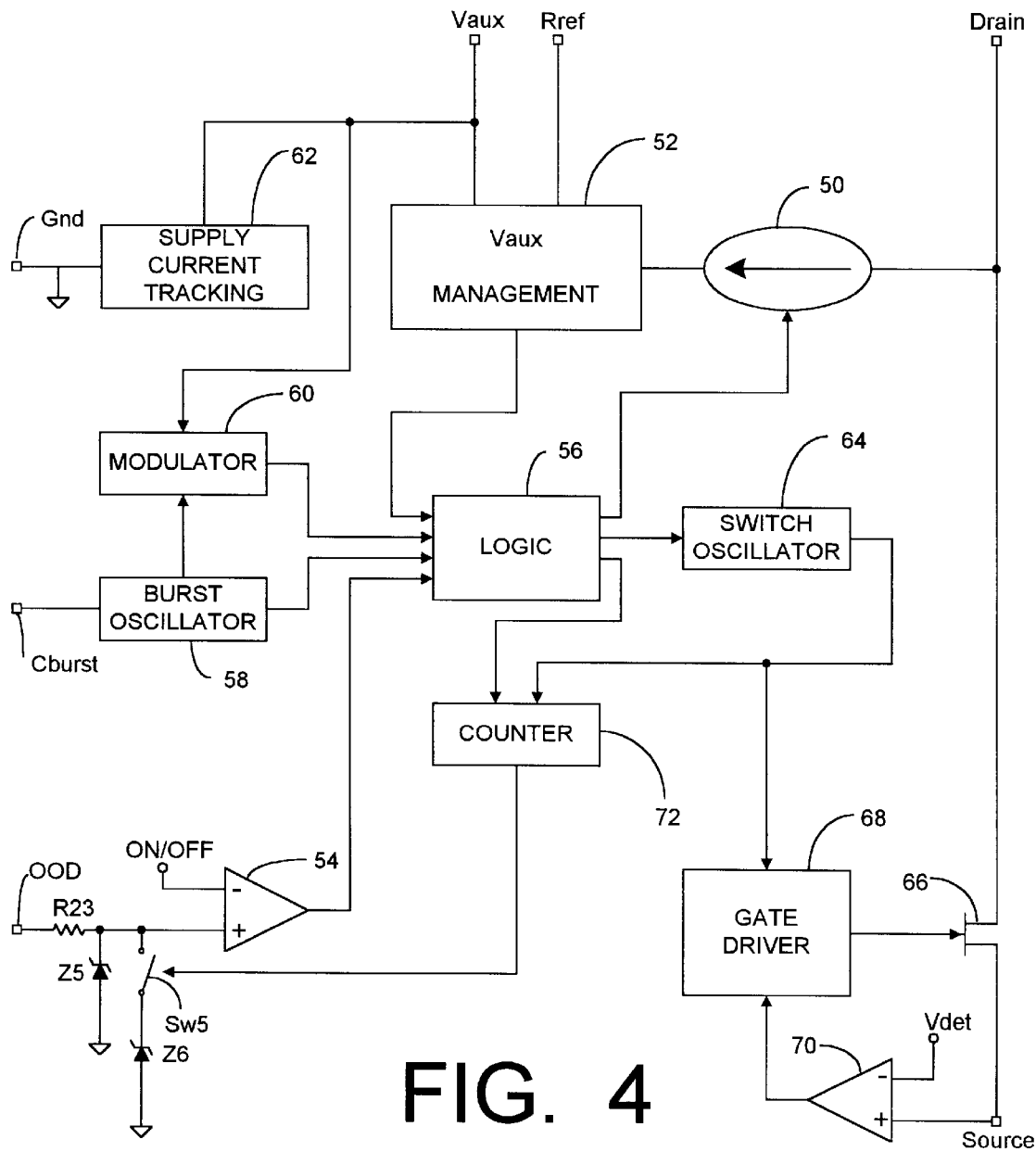
FIG. 4 shows a schematic block diagram of a second controller for the switched mode power supply circuit.

FIG. 4 shows a schematic block diagram of the second controller IC2. The second controller IC2 includes a start-up current source 50 coupled to the first terminal Drain, and a Vaux management circuit 52 coupled to the Vaux and Rref inputs. The OOD input is connected to a resistor R23 and then to a non-inverting input of a comparator 54 which receives an ON/OFF level signal of, e.g., 0.7 V., at an inverting input. An output of the comparator 54 is applied to a logic circuit 56. A burst oscillator 58 is connected to the Cburst input and applies output signals to a modulator 60 and to the logic circuit 56. The modulator 60 is also coupled to the Vaux input and applies an output signal to the logic circuit 56. The burst oscillator 58 generates a triangle wave signal for determining the burst frequency. The burst frequency is determined accurately and temperature independent by the externally connected reference resistor R16 and burst capacitor C16. The modulator 60 determines the regulation level of the Vaux voltage. For a burst duty cycle from 0% up to 40%, the Vaux voltage is regulated to 20 V. for stable operation in burst mode, a decrease in regulation voltage is integrated for a burst duty cycle above 40%. At 100% burst duty cycle, the regulation voltage is 17.5 V.

For obtaining good load regulation, especially with low cost transformers, the second controller IC2 includes a supply current tracking circuit 62 coupled between the Vaux input and the ground input Gnd. The current tracking circuit 62 makes the supply current of the second controller IC2 a function of the secondary load. This makes the voltage drop across the series resistance of the auxiliary winding proportional to the voltage drop across the series resistance of the secondary winding. Therefore, the secondary output voltage tracks with the Vaux regulation voltage.

The logic circuit 56 has an output for controlling the start-up current source 50, and an output for starting a switch oscillator 64. The switch oscillator 64 determines the switching frequency and the maximum on-time of the power switch 66. The maximum on-time is set at 66% of the switching period. The switching frequency is determined by the reference resistor R16 at the Rref input of the second controller IC2, and an internal capacitor. The switching frequency can be adjusted in a range from 20 kHz to 52 kHz, thus above the audible spectrum. The output from the switch oscillator 64 is applied to a gate driver 68 for driving the power switch 66. A primary current comparator 70 is coupled to the source Src input of the second controller IC2 and senses the voltage across the external sense resistor R17 which reflects the primary current. The detection level of the comparator 70 is Vref=0.5 V. An output from the comparator 70 is connected to an input of the gate driver 68. The comparator 70 signals the gate driver 68 when the Src voltage exceeds the Vref level. The gate driver switches on the power switch 66 at the beginning of every oscillator cycle and turns off the power switch 66 by the primary current comparator 70 or by the maximum on-time. The power switch 66 is also prevented from turning on if the Vaux voltage has reached its regulation level.

The output from the switch oscillator 64 is also applied to a counting input of a counter 72 which receives a reset signal from the logic circuit 56. If the count value in the counter 72 exceed a predetermined level, e.g., 56, the counter activates the switch Sw5 which connects a Zener diode Z6 to the non-inverting input of the comparator 54.

In low power stand-by mode, the switch Sw4 is opened by the microprocessor. The second controller IC2 operates in bursts by cyclically switching the internal power switch 66. At the same time, the counter 72 counts the number of pulses in each burst. If this number is less than 56, switch Sw5 remains open and the voltage on the OOB input of the first controller IC1, which is connected to the OOD input of the second controller IC2, is clamped at 1.4 V by the Zener diode Z5 connected to the non-inverting input of comparator 54. Since this 1.4 V is less than the turn-on voltage of 2.4 V as determined by the comparator 34, the first controller IC1 is turned off.

When it is desired to turn on the switched-mode power supply circuit, the microprocessor closes switch Sw4 connecting the load LD across the control output capacitor C13. This additional drain on the voltage of the secondary winding L15 is reflected by a drop in the auxiliary voltage Vaux of the auxiliary primary winding L17 of the second transformer TR2 at the Vaux input of the second controller IC2. As a result, the Vaux management circuit 52 causes the logic circuit 56 to turn on the switch oscillator 64, and, in turn, activating the gate driver 68 and the power switch 66, for a longer burst duration. This has the effect of applying additional power to the primary winding L16, this additional power being transferred to the auxiliary primary winding L17 to charge up the auxiliary voltage Vaux. The pulse count in this longer burst duration now exceeds 56 causing the counter 72 to turn on the switch Sw5 connecting the Zener diode Z6 to the non-inverting input of the comparator 54. This has the effect of raising the clamp level on the OOD input to 4.0 V which is higher than the turn on level (2.4 V) of the first controller IC1. The first controller IC1 is now turned on to control the power to the secondary winding L12 for supplying the main power.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A switched-mode power supply circuit having an operating mode and a low power stand-by mode, said switched-mode power supply circuit comprising:

means for generating a d.c. supply voltage having a first output terminal and a second output terminal;

a first transformer having a primary winding, an auxiliary primary winding and a secondary winding, said primary winding having a first terminal coupled to the first output terminal of said generating means, and a second terminal;

a second transformer having a primary winding, an auxiliary primary winding and a secondary winding, a voltage across said auxiliary primary winding tracking a voltage across said secondary winding, said primary winding having a first terminal coupled to the first output terminal of said generating means, and a second terminal;

a controllable switch connected in series with the second terminal of said primary winding and the second output terminal of said generating means;

a main output capacitor coupled across output terminals of said secondary winding of said first transformer for providing a first main output voltage in the operating state and a second main output voltage in the stand-by mode, said second main output voltage being lower than said first main output voltage;

a control output capacitor coupled across output terminals of said secondary winding of said second transformer for providing a control output voltage;

means for selectively coupling an additional load across said control output capacitor;

a first controller having an output for supplying switching signals to said controllable switch, an auxiliary voltage sensing input coupled, via a shunting auxiliary capacitor, to said auxiliary primary winding of said first transformer, and a control input, said first controller comprising means for turning off said start-up current source and for stopping said switching signals when a voltage on said control input drops below a predetermined level, and means for coupling said control input to the first output terminal of said generating means to receive a voltage greater than said predetermined level; and a second controller having a first terminal coupled to the second terminal of the primary winding of the second transformer, a second terminal coupled to the second output terminal of said generating means, a third terminal coupled to said auxiliary primary winding of said second transformer for detecting a voltage thereon, and a fourth terminal coupled to the control input of said first controller, wherein to effect said low power stand-by mode, said selective coupling means uncouples said additional load from across said control output capacitor, and said second controller, through said fourth terminal prevents a voltage on said control input of said first controller from exceeding said predetermined level, and said operating mode is effected by said selective coupling means coupling said additional load across said control output capacitor, and said second controller allowing a voltage on said control input of said first controller to exceed said predetermined level.

2. A switched-mode power supply circuit as claimed in claim 1, characterized in that said switched-mode power supply circuit further comprises a microprocessor coupled across said control output capacitor, said microprocessor controlling said selective coupling means to switch between said low power stand-by mode and said operating mode.

3. A switched-mode power supply circuit as claimed in claim 1, characterized in that said second controller comprises:

a power switch coupled between said first and second terminals of said second controller;

means for generating switching signals for said power switch, said switching signals being in the form of bursts of pulses, a number of said pulses in said bursts being indicative of an amount of power applied to said primary winding of said second transformer;

means for counting the number of pulses in each of said bursts of said switching signals, said counting means generating a count signal when the number of pulses exceeds a predetermined amount; and means for selectively clamping said fourth terminal to first voltage level below said predetermined level, and, in response to said count signal from said counting means, to a second voltage level above said predetermined level.

4. A switched-mode power supply circuit as claimed in claim 3, characterized in that said switching signal generating means comprises:

a first oscillator for setting an occurrence frequency for said bursts;

a second oscillator for setting a pulse repetition frequency for the pulses in said bursts; and means for monitoring the voltage on said third terminal of said second controller, said monitoring means having an input coupled to an output of said first oscillator and an output coupled to said second oscillator for activating said second oscillator, an output of said second oscillator being coupled to said power switch and to said counting means.

5. A switched-mode power supply circuit having an operating mode, a burst stand-by mode and a low power stand-by mode, said switched-mode power supply circuit comprising:

means for generating a d.c. supply voltage having a first output terminal and a second output terminal;

a first transformer having a primary winding, an auxiliary primary winding and a secondary winding, said primary winding having a first terminal coupled to the first output terminal of said generating means, and a second terminal;

a second transformer having a primary winding, an auxiliary primary winding and a secondary winding, a voltage across said auxiliary primary winding tracking a voltage across said secondary winding, said primary winding having a first terminal coupled to the first output terminal of said generating means, and a second terminal;

a controllable switch connected in series with the second terminal of said primary winding and the second output terminal of said generating means;

a main output capacitor coupled across output terminals of said secondary winding of said first transformer for providing a first main output voltage in the operating state and a second main output voltage in the stand-by mode, said second main output voltage being lower than said first main output voltage;

a control output capacitor coupled across output terminals of said secondary winding of said second transformer for providing a control output voltage;

first means for selectively coupling a load across the output terminals of said secondary winding of said second transformer;

second means for selectively coupling one of the output terminals of said secondary winding of said first transformer to said secondary winding of said second transformer during said burst stand-by mode;

an opto-coupler having light emitting means and light detecting means optically coupled to said light emitting means;

third means for selectively coupling the light emitting means of said opto-coupler across said control output capacitor during said burst stand-by mode;

means for causing said light emitting means to emit light to said light detecting means when the control output voltage across said control output capacitor exceed a predetermined value during said burst stand-by mode;

a first controller having an output for supplying switching signals to said controllable switch, an auxiliary voltage sensing input coupled, via a shunting auxiliary capacitor, to said auxiliary primary winding of said first transformer, and a stand-by mode detecting input coupled to an output of said light detecting means, said light detecting means having an input coupled to receive said auxiliary voltage, said first controller comprising a start-up current source for charging said auxiliary capacitor during start-up of said switched-mode power supply, whereby, during said burst stand-by mode, said start-up current source is used to intermittently charge the auxiliary capacitor when said controllable switch is not switching, said first controller further comprising means for turning off said start-up current source and for stopping said switching signals when a voltage on said stand-by mode detecting input drops below a predetermined level; and a second controller having a first terminal coupled to the second terminal of the primary winding of the second transformer, a second terminal coupled to the second output terminal of said generating means, a third terminal coupled to said auxiliary primary winding of said second transformer for detecting a voltage thereon, and a fourth terminal coupled to the stand-by mode detecting input of said first controller, wherein to effect said low power stand-by mode, said first selective coupling means uncouples said load from said secondary winding of said second transformer, and said second controller, through said fourth terminal prevents a voltage on said stand-by mode detecting input of said first controller from exceeding said predetermined level, and said operating mode is effected by said first selective coupling means coupling said load to said secondary winding of said second transformer, and said second controller allowing a voltage on said stand-by mode detecting input of said first controller to exceed said predetermined level.

6. A switched-mode power supply circuit as claimed in claim 5, characterized in that said switched-mode power supply circuit further comprises a microprocessor coupled across said control output capacitor, said microprocessor controlling said first selective coupling means to switch between said low power stand-by mode and said operating mode, and said microprocessor further controlling said second and third selective coupling means to switch between said burst stand-by mode and said operating mode.

7. A switched-mode power supply circuit as claimed in claim 5, characterized in that said second controller comprises:

a power switch coupled between said first and second terminals of said second controller;

means for generating switching signals for said power switch, said switching signals being in the form of bursts of pulses, a number of said pulses in said bursts being indicative of an amount of power applied to said primary winding of said second transformer;

means for counting the number of pulses in each of said bursts of said switching signals, said counting means generating a count signal when the number of pulses exceeds a predetermined amount;

means for selectively clamping said fourth terminal to first voltage level below said predetermined level, and, in response to said count signal from said counting means, to a second voltage level above said predetermined level.

8. A switched-mode power supply circuit as claimed in claim 7, characterized in that said switching signal generating means comprises:

a first oscillator for setting an occurrence frequency for said bursts;

a second oscillator for setting a pulse repetition frequency for the pulses in said bursts; and means for monitoring the voltage on said third terminal of said second controller, said monitoring means having an input coupled to an output of said first oscillator and an output coupled to said second oscillator for activating said second oscillator, an output of said second oscillator being coupled to said power switch and to said counting means.

* * * * *